United States Patent [19]
Parsons et al.

[11] Patent Number: 5,878,358
[45] Date of Patent: Mar. 2, 1999

[54] DATA PROCESSOR FOR SELECTING DATA ELEMENTS HAVING THE HIGHEST MAGNITUDE VALUES AND STORING THEM IN ASCENDING ORDER

[75] Inventors: Michael Colin Parsons, Ryde; Paul Harvey Ronald Jolly, Fareham, both of Great Britain

[73] Assignee: MP Research Ltd., Ryde, Great Britain

[21] Appl. No.: 714,048

[22] PCT Filed: Feb. 15, 1995

[86] PCT No.: PCT/GB95/00312

§ 371 Date: Sep. 5, 1996

§ 102(e) Date: Sep. 5, 1996

[87] PCT Pub. No.: WO95/25302

PCT Pub. Date: Sep. 21, 1995

[30] Foreign Application Priority Data

Mar. 17, 1994 [GB] United Kingdom .................... 9405285

[51] Int. Cl.[6] ...................................................... G06F 7/06
[52] U.S. Cl. .............................................. 701/1; 395/898
[58] Field of Search .............................. 701/1, 222, 223; 395/898; 344/171

[56] References Cited

U.S. PATENT DOCUMENTS

| 3,493,939 | 2/1970 | Dunn et al. ............................ 340/173 |
| 5,179,712 | 1/1993 | Abbound ................................ 395/898 |
| 5,222,243 | 6/1993 | Briggs et al. .......................... 395/898 |

FOREIGN PATENT DOCUMENTS

| 0 413 951 | 2/1991 | European Pat. Off. . |
| 0 441 533 | 8/1991 | European Pat. Off. . |

Primary Examiner—Tan Q. Nguyen
Attorney, Agent, or Firm—Venable; Robert J. Frank

[57] ABSTRACT

A data processor for automatically selecting from a series of discrete input data elements, the elements having the N highest values and for storing the selected elements, in ascending order according to their values, one in each of N identical cells connected in cascade and wherein means are provided for causing the stored data elements to be readout as a series of a distance parallel data elements. The data proccessor can be used in a number of applications including a star censor for a satellite, or a number of vehicle control system including a visual protection sensor for automobiles and other vehicles, and vehicle tracking/steering systems, or at least partial alignment of the antenna of at least two equipment, or a telephone headset for a mobile radio system.

47 Claims, 6 Drawing Sheets

DATA PROCESSOR FOR SELECTING DATA ELEMENTS HAVING THE HIGHEST MAGNITUDE VALUES AND STORING THEM IN ASCENDING ORDER

The invention relates to a data processor and, in particular, to an optical data processor.

The data processor according to the invention is suitable for use in a number of applications, for example, a star sensor for a satellite, vehicle control systems including a visual protection sensor for automobiles and other vehicles, and vehicle tracking/steering systems, at least the partial alignment of the antenna of at least two equipments, a telephone handset for a mobile radio system, and many other applications that will be directly evident to persons skilled in the art.

In all optical sensing systems the optical sensor generally produces significantly more data than is actually required for the purposes of evaluating the received data. For example, in a star sensor used on a satellite, the optical sensor is a charge coupled device (CCD) consisting of a two dimensional array of many thousands of individual elements or pixels, for example, an array of 250,000 to 1,000,000 sensor elements or pixels.

When such a sensor is exposed to the night sky it can see only a few stars but in order to evaluate the data relating to the stars it is necessary to access the data associated with all the pixels of the CCD array. Since the number of stars is small but the number of pixels is large the percentage of useful information is very small, i.e. approximately one in ten thousand has useful information.

In most optical sensing systems only a relatively small amount of the received data is likely to be of interest, in that the sensing system will only want to know where something is, not where it is not. In the case of a star sensor, the only information that will be required is the locations of the stars relative to each other.

In practice, the CCD array of a star sensor would produce approximately 40 million bits of data per second of which only 1080 will contain useful data.

In order to allow a star sensor to identify the star field it is viewing, only the brightest stars can be used, and in principle only three stars are required in any one field of view.

Thus, the number of pixels which need to be identified is therefore only 3, but due to the fact that a star image may be centered at the junction of 4 pixels or, due to errors in focusing, may illuminate more than one pixel, the number must be increased. To ensure that the three brightest stars' position can be identified the data processor of the star sensor must return the locations of the top 30 plus pixels. This number allows the brightest star to illuminate one pixel and also spill over into the 8 adjoining pixels such that they become the second brightest object. This is then repeated for the other 2 stars. This gives a minimum of 27 pixels. Additionally the CCD array may have some blemishes, therefore some additional pixels may be required in order to effect identification. With known methods of data processing, it is usual to evaluate all of the data by means of a computer which is adapted to sort through the data in accordance with given criteria to find the relevant bits. This is either slow, or requires the use of a very powerful data processor.

Known arrangements for automatically sorting and storing data words/samples, in rank order, are described in European patent applications, publication numbers 0 441 533 A2 and 0 413 951 A1.

In particular, EP A 0 441 533 describes apparatus for receiving and automatically storing data words, according to magnitude, in a self-sorting register stack, wherein the stored data words are maintained in sequential locations with data words of lesser magnitude preceding data words of greater magnitude, wherein incoming data is simultaneously compared with each of the stored data words, and wherein a new data word is automatically inserted into the correct register on the stack, the contents of that register, and subsequent registers, being moved down one location to accommodate the new data word. Thus, with this apparatus and other known automatic data sorting and storage arrangements, the computation overhead per incoming data sample is relatively high due, in the main, to the need for the incoming data to be compared with each of the stored data words.

In addition, the described arrangement of EP A 0 441 533 effectively operates in one clock cycle, whereas the other known arrangement, referred to above, which is a rank order processing array, and which operates with RAM data, does not effect operation in one clock cycle.

Furthermore, the described arrangement of EP A 0 441 533 uses a fixed number of internal registers, or external registers, and any increase in the number of stack registers would require an increase in the width of the control bits.

In addition, the described arrangement of EP A 0 441 533 effectively operates in one clock cycle, whereas the other known arrangement, referred to above, which is a rank order processing array, and which operates with RAM data, does not effect operation in one clock cycle.

With the present invention, the number of identical cells may be increased without increasing the size of the control system. The described embodiment of the present invention uses 16 identical cells.

Also, with the present invention, the number of comparisons per incoming data element, for effecting the automatic selection and sorting of the incoming data, is minimized through use, at the input of the data processor, of the first comparator means, and the operation is effected in one clock cycle.

In particular, the first comparator means of the present invention are adapted to:

compare input data elements with an existing stored data element having the lowest value;

disregard input data elements having a value lower in rank than the said existing stored data element, without the need for further comparisons with other stored data elements; and effect the selection and storage of an input data element having a value higher in rank than the said existing stored data element, the selected data element being stored in that one of the N cells that corresponds to its position in the ascending order of element values.

The contents of the said one of the N cells, and the lower cells, are transferred to, and stored in, an adjacent lower cell, and the data element stored in the lowest of the N cells is used by the first comparator means for comparison with subsequently received input data elements.

The input data element may be translated into a discrete digital word having one part thereof of a value indicative of the magnitude of the respective input data element and another part thereof indicative of the position of the respective element relative to the other input data elements.

In an alternative arrangement, each input data element may be representative of the intensity of light falling on a light sensor which forms part of a two dimensional array of light sensors.

At least the N identical cells and the first comparator means may be in the form of an integrated circuit chip, or a number of integrated circuit chips connected in cascade. The use of cascaded integrated circuit chips provides an ideal means for expanding the number of cells for the data processor, according to the invention.

The present invention may form part of a data processing system which may be a star sensor, or a telephone handset, or a system adapted to control, and/or identify, the relative positions of at least two moving vehicles, or determine the separation distance between two moving vehicles, or a system for controlling at least two equipments, or the antenna of at least two satellite dishes.

Furthermore, the described arrangement of EP A 0 441 533 uses a fixed number of internal registers, or external registers, and any increase in the number of stack registers would require an increase in the width of the control bits.

It is an object of the present invention to provide a data processor which automatically selects and sorts the relevant data at the rate at which the data is received, for example, at the rate the data is generated by the charged coupled array of a star sensor, and which minimises the number of comparisons per incoming data element for effecting the automatic selection and sorting of the incoming data.

The invention provides a data processor for selecting from a series of discrete input data elements, the elements having the N highest magnitude values and for storing the selected elements, in ascending order according to their value, one in each of N identical cells connected in cascade, characterised in that the element having the next highest value is stored in first comparator means that are adapted, on receipt of an input data element having a value higher than the value of the element stored therein, to generate an output for effecting storage of the said data element, according to its value, in that one of the N cells that corresponds to its position in the ascending order of element values, in that the elements of lower value in the said one of the N cells and the lower cells are transferred to and stored in the adjacent lower cell, the element stored in the lowest of the N cells being transferred to the comparator means for comparison with the subsequently received input data elements, and in that means are provided for causing the stored elements to be read out as a series of discrete data elements.

The foregoing and other features according to the present invention will be better understood from the following description with reference to the accompanying drawings in which.

Figure 1:
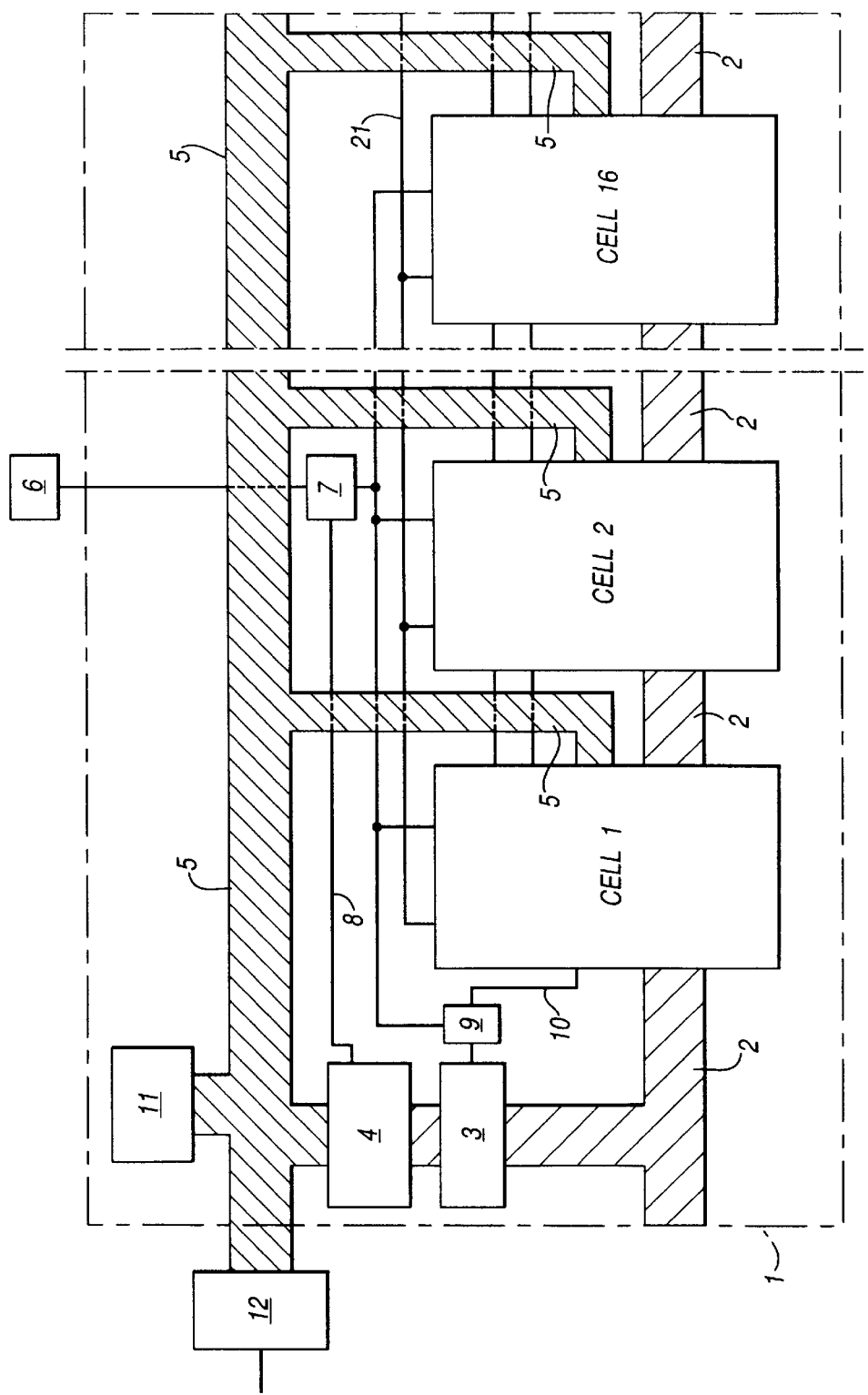
FIG. 1 illustrates a data processor according to the present invention.

Referring to FIG. 1 of the drawings, the data processor according to the present invention, which is illustrated therein, includes an integrated circuit chip 1 comprising 16 identical cells 1 to 16 connected in cascade, the output 2 of each of the cells 2 to 16 which is a parallel data bus, being connected to the input of the adjacent cell.

In principle, any solid state chip technology can be used to produce the chip 1, for example, SOS, CMOS, TTL, BiCMoS, or GaAs. Alternatively, the chips 1 can be fabricated using optical processing techniques.

In order to facilitate cascading of a number of chips, the output of the cell 1 is connected to output terminal pins on the chip 1 and the input of the cell 16 is connected to input terminal pins on the chip 1.

The output 2 of the cell 1 is also connected to the input of a latch 3, the output of which is connected to an input of a comparator 4.

Each of the cells 1 to 16 is connected to an input data bus 5 and to a source of clock pulses 6 via a gating device 7. The data bus 5 is also connected to an input of the comparator 4. The operation of the gating device 7 and thereby the connection of the source of clock pulses 6 simultaneously to the cells 1 to 16, is effected by the output 8 of the comparator 4.

A gating device 9 which is also connected to the source of clock pulses 6 via the gating device 7, is interposed between an output 10 of the cell 1 and the control input for the latch 3.

The input data bus 5 is further connected to a position counter 11 and to input and output terminal pins on the chip 1 to facilitate cascading of a number of chips.

The input data terminals on the chip 1 are connected to an analogue to digital converter (ADC) 12 for converting each element of an analogue input signal into an n-bit digital word which is indicative of the magnitude of the respective element of the input signal. The counter 11 generates in respect of each element of the input signal a z-bit digital word which is indicative of the position of the respective element of the input signal relative to the other elements and which is combined with the n-bit digital word to provide an n+z-bit digital word.

The cells 1 to 16 are interconnected by means of control lines 22 and 23 which, as will be subsequently outlined in greater detail, provide the means for effecting the selection and storage functions of the data processor.

In one application of the data processor according to the present invention, the input to the ADC 12 is successively connected to the output of each row of a two dimensional array of light sensors. The output of each row of the array is a series of discrete analogue signal elements which are each representative of the intensity of the light falling on the corresponding light sensor in the row.

The position counter 11 for this application is an X-Y counter, which is stepped one position in the X-direction on receipt of the output of each row of the array and which is stepped one position in the Y-direction on receipt of each one of the series of discrete analogue signal elements of the respective row of the array.

The magnitude of the light intensity can be represented by an 8-bit digital word and the position of each of the signal elements relative to the other elements can be represented by a 24-bit digital word, 12-bits of the 24-bit word being indicative of the position of a row of elements relative to the other rows in the X-direction whilst the other 12-bits of the 24-bit word are indicative of the position of each element of a row in the Y-direction.

Figure 2:
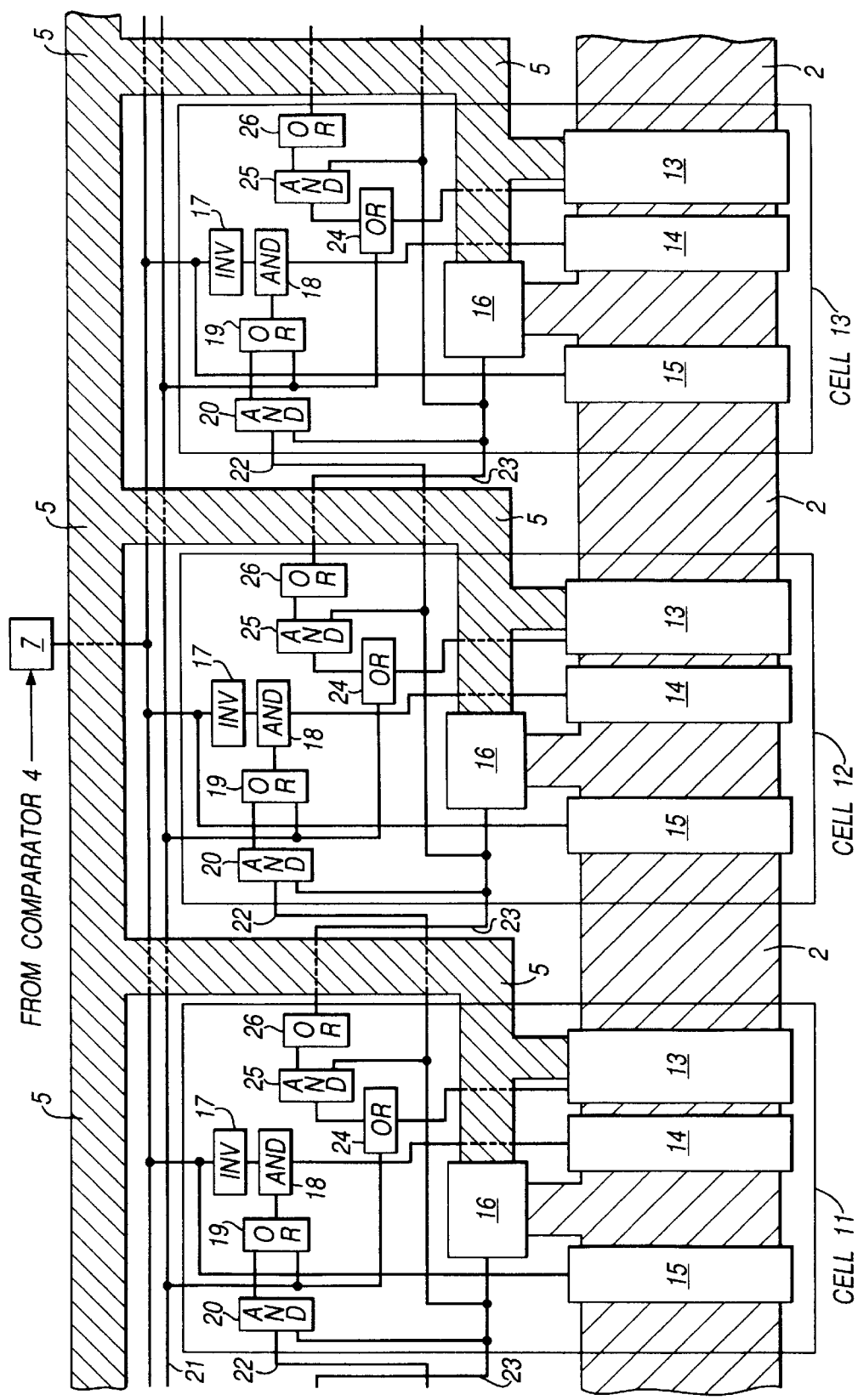
FIG. 2 illustrates an enlarged view of part of the data processor illustrated in FIG. 1 of the drawings.

The structure of the identical cells 1 to 16 of FIG. 1 of the drawing is illustrated in an enlarged view in FIG. 2 of the drawings. As illustrated in FIG. 2 which shows three of the sixteen cells, each of the cells includes a data selection unit 13 the inputs of which are respectively connected to the input data bus 5 and the data bus 2. The output of the data selection unit 13 is connected to a latch 14. The output of the latch 14 is connected to the input of a latch 15 and to an input of a comparator 16, the other input of the comparator 16 being connected to the input data bus 5.

The connection of the source of clock pulses to each of the cells via the gating device 7 is effected by connecting the output of the gating device to an inverter 17 and to the control input of the latch 15.

The output of the invertor 17 is connected to the input of an AND gate 18, the output of which is connected to the control input of the latch 14. The other input of the AND gate 18 is connected to the output of an OR gate 19. The inputs of the OR gate 19 are respectively connected to the output of an AND gate 20 and to a readout line 21 which is connected to a supply circuit external to the chip.

Whilst the input of the AND gate 20 is shown connected via the line 22 to the output of the comparator 16 of the adjacent lower cell in the cascaded series of cells 1 to 16, in practice, the AND gate 20 of each cell will have a number of input lines 22 which are each connected to a separate one of the outputs of the comparators of all of the lower cells. For example, the AND gate 20 of the cell 11 will have ten inputs which are each connected to the output of the comparator 16 of respective ones of the cells 1 to 10. In addition, a further input of the AND gate 20 is connected to the output of the comparator 16 of the same cell.

The readout line 21 is also connected to the input of an OR gate 24 the output of which is connected to the control input of the data selection unit 13. The other input of the OR gate 24 is connected to the output of an AND gate 25. The inputs to the AND gate 25 are respectively connected to the output of the comparator 16 and the output of an OR gate 26.

Whilst the input to the OR gate 26 is shown connected via the line 23 to the output of the comparator 16 of the adjacent higher cell in the cascaded series of cells 1 to 16, in practice, the OR gate 20 of each cell will have a number of input lines 23 which are each connected to a separate one of the outputs of the comparator 16 of all the higher cells. For example, the OR gate 26 of the cell 11 will have five inputs which are each connected to the output of the comparator 16 of respective ones of the cells 12 to 16.

All of the control lines for the cells 1 and 16 which are not connected to an adjacent cell are connected to terminal pins on the chip 1 to facilitate cascading of a number of chips.

On initiating the operation of the data processor illustrated in FIGS. 1 and 2 of the drawings, the discrete elements of the analogue input signal having the sixteen highest magnitude values will be stored, in ascending order according to their magnitude value, one in each of the cells 1 to 16 in a manner to be subsequently outlined, i.e. the element having the highest value will be stored in cell 16 and the element having the lowest value will be stored in cell 1. The element having the next highest magnitude value will be stored in the latch 3.

On the assumption that the data processor is in a condition as is outlined in the preceding paragraph, then the data element stored in each of the cells, i.e. at the input of the comparator 16 of the cell, is the same value as the data element at the output of the latch 15 of the cell, i.e. as applied to the data selection unit 13 of the adjacent lower cell. On receipt of an input data element having a value higher than the element stored in the latch 3, a signal will be generated at the output 8 of the comparator 4 and will cause operation of the gating device 7 and thereby the connection of the source of clock pulses 6 simultaneously to the cells 1 to 16.

This new data element will be applied by means of the data bus 5 to the input of the comparator 16 and to the input of the data selection unit 13 of each of the cells 1 to 16.

On the assumption that the new data element is of a value higher than the data element stored in cell 12, then on the rising edge of the clock pulse, the input to the inverter 17 and to the latch 15 of each of the cells 1 to 16 will change from a logic value "0" to a logic value "1" and this will result in the input to the AND gate 18 of each cell being at the value "0".

Since the value of the data element stored in each of the cells 1 to 12, i.e. as applied to the comparator 16, is less than the value of the new data element, the output of the comparator 16 of each of the cells 1 to 12 will change from "0" to "1". This will cause all of the inputs and thereby the output of the AND gates 20 of the cells 1 to 12 to change from "0" to "1". The output of the comparator 16 of the cell 13 will remain at "0", therefore, one of the inputs to the AND gate 20 of the cell 13 will remain at "0", as will the output of this AND gate 20.

Whilst the readout line 21 will be at the logic value "0", the other input of the OR gate 19 of each of the cells 1 to 12 will be at the logic value "1". The output of the OR gate 19 of the cells 1 to 12 will, therefore, be at the logic value "1". However, the input of the AND gate 18 will be at "0", as will be its output. The control input of the latch 14 will, therefore, be at "0" and a control input of the latch 15 will change from "0" to "1".

The outputs of the comparator 16 of each of the cells 1 to 12 will cause the input of the OR gate 26 of the cells 1 to 11 change from "0" to "1" and thereby an input to the AND gate 25 of each of the cells to change from "0" to "1". Since the other input of the AND gate 25 of each of the cells 1 to 11 will also have changed from "0" to "1", as a result of the change in the output of the comparator 16, an input, and thereby the output, of the OR gate 24 will also change from "0" to "1". This will cause the control signal for the data selection unit 13 of each of the cells 1 to 11 to change from "0" to "1" and thereby allow the output of the adjacent higher cell, respectively cells 2 to 12, to be applied to the input of the associated latch 14.

Since there is no change in the state of the output of the comparator 16 of each of the cells 13 to 16, there will be no change in the state of the input to the gates 24 to 26 of the cells 12 to 16. Under these conditions, the control signal for the data selection unit 13 of the cells 12 to 16 will be at the logic value "0" thereby allowing the new data element on the input bus 5 to be applied to the input of the latch 14 of each of the cells 12 to 13.

On the next falling edge of the clock pulse, the inputs to the invertor 17 and latch 15 of each cell will change from "1" to "0" and the output of the invertor 17 will change from "0" to "1". Both inputs to the AND gates 18 of the cells 1 to 12 will, therefore, be at the logic value "1" and the output of these gates and thereby the control signal for the latch 14 of the cells 1 to 12 will change from "0" to "1". This will effect operation of the latch 14 of the cells 1 to 12 and allow the data elements at the inputs of each of these latches to be transferred to the inputs of the latch 15 and the comparator 16 of the respective cells.

Thus, the new data element will be stored in the cell 12 and the data elements at the outputs of each of the cells 2 to 12 will be transferred to the adjacent lower cell, respectively cells 1 to 11.

Since there is no change in the state of one of the inputs to the AND gate 18, i.e. from the OR gate 19, of the cell 13 and the higher cells 14 to 16, the output of these AND gates and thereby the control signals for the latch 14 of each of the cells 13 to 16 will remain at "0" and, therefore, data transfer will not be effected.

On the next rising edge of the clock pulse, the control signal for the latch 15 of each of the cells 1 to 16 will change from "0" to "1" and the latches will operate to cause the data elements at the input of the latches to be transferred to the output of the respective cell.

This will effect a change in the outputs of the cells 1 to 12 only because there has been no change in the data elements stored in the cells 13 to 16. The output of cell 1 is transferred to the latch 3 (see FIG. 1) because the rising edge of the clock pulse and the output of the comparator 16 of cell 1 which are both at the logic value "1", cause the output of the gating device 9 to change from "0" to "1" and thereby effect operation of latch 3.

If, on the next falling edge of the clock pulse, the state of the readout line 21 is changed from a logic "0" to a logic "1" in order to effect readout of the data elements stored in the cells 1 to 16, then this will effect operation of the OR gate 19 and the AND gate 1 of each cell 1 to 16 which, in combination with the output of the invertor 17, will cause the control input to the latch 14 to change from "0" to "1". The OR gate 24 will also operate and cause the control input of the data selection unit 13 to change from "0" to "1" thereby causing the input of each of the cells to be transferred to the input of the latch 15. The next rising edge of the clock pulse will cause the latch 15 of each cell to operate and the stored data element to be readout and applied to the input of the adjacent cell. This process will be repeated until all of the data elements have been transferred to the output of the data processor, i.e. the output of the cell 1.

On completion of the readout of the contents of the cells 1 to 16, the cells will be reset by applying thereto, on the data bus 5, a data signal of an appropriate value, for example, the value of the data element stored in the latch 3.

As previously stated, two or more of the chips 1 could be connected in cascade in order to increase the number of cascaded cells.

A distinct advantage of the data processor according to the present invention which utilises a chip 1 in CMOS, is that the cells 1 to 16 are only drawing current from the power source when an input data signal exceeds the value of the data element stored in the latch 3. This gives rise to efficient utilisation of the available power and is especially useful when the power source is a battery.

It will be directly evident from the foregoing that the data processor according to the present invention could be used in a wide range of applications where the output data signals from a sensor have to be selected on the basis of their value being above a predetermined level. For example, the data processor could be used to controls and/or identify, the relative positions of at least two moving vehicles, i.e. to control the circuits of two moving vehicles where the distance between the vehicles needs to be maintained at a predetermined level. Alternatively, each of the vehicles could be fitted with either two lights, or reflective, patches on an exposed surface thereof and the data processor would be used to select the brightest points thereby enabling the position and separation distance of the vehicles to be identified.

Thus, the data processor according to the present invention could be used as part of a visual protection sensor for automobiles and other road vehicles and provide an electronic buffer for such vehicles. With this application, the data processor according to the present invention would be connected to an optical sensor, for example, the optical sensor which is diagrammatically illustrated in FIG. 4 of the drawings and which consists of a light sensor 35, for example, a single row linear CCD (charge coupled device) image sensor, a filter unit 33 for, and located in alignment with, the light sensor 35, and a lens 34 interposed between the light sensor 35 and the filter unit 33.

Figure 4:
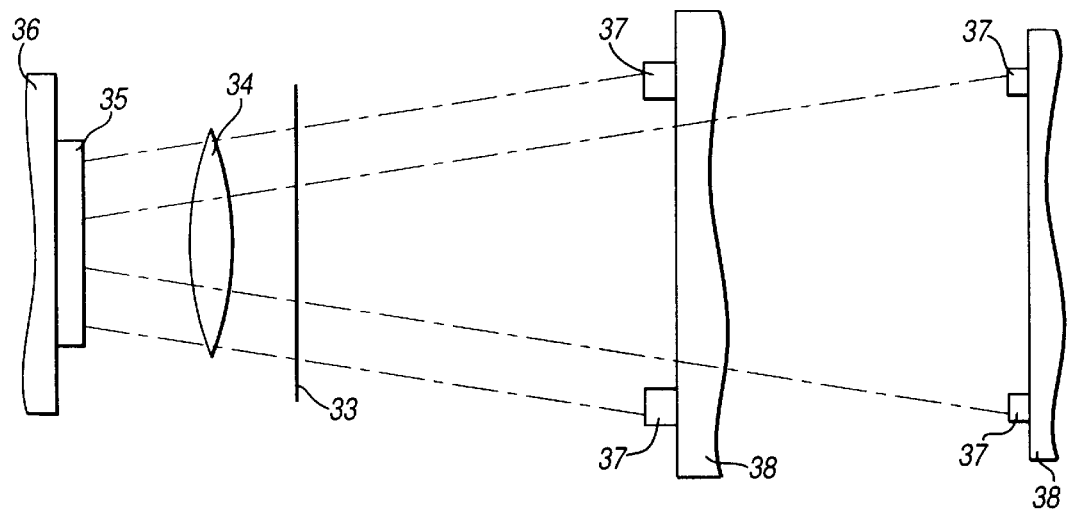
FIG. 4 illustrates a visual protection sensor for. automobiles and other vehicles which includes the data processor illustrated in FIG. 1 of the drawings.

As illustrated in FIG. 4, the sensor 35 would be fitted to the front of a vehicle 36, in a central position, and the data processor would be adapted to read-out all the pixels of the CCD image sensor 35. In operation, application of the brakes by the driver of a vehicle 38, immediately in front of the vehicle 36, will cause illumination of the brake lights 37 of the vehicle 38 and this will, in turn, cause illumination of two spots on the CCD image sensor 35. The data processor will read-out all the pixels of the CCD image sensor 35 which, because of filter 33, will only have two bright points. The difference between the locations of the two bright spots, i.e. their separation distance, is proportional to the distance between the two vehicles 36 and 38. and the separation distance of the two brake lights 37. On the assumption that the average separation distance between the brake lights 37 of the vehicle 38 is approximately 1.2 meters, then the separation distance between the two bright spots can be used directly as a measure of the distance between the vehicles 36 and 38.

The speed of the vehicle 36 which could be provided by an engine management unit for the vehicle, could be used, by the visual protection sensor of FIG. 4, to trigger a warning, either visual or audio, that the minimum distance between the vehicles 36 and 38, for the speed that they are currently travelling, has been exceeded. If the speed of the vehicle 36 is not available, then a manual system could be employed.

At night, the rear lights of the vehicle 38 will enable the visual protection sensor of the vehicle 36 to operate in a continuous mode, monitoring the distance between the vehicles 36 and 38 but, during the daytime, the visual protection sensor of the vehicle 36 will only operate when the brakes of the vehicle 38 are applied by the driver. This is probably an acceptable situation because the most critical time is likely to be at night.

If, however, the speed of the vehicle is available, then the visual protection sensor could be adapted to adjust for such conditions as traffic jams etcetera during which vehicles are very much closer together and, as a consequence of this, the vehicle speeds are almost zero.

The operation of the visual protection sensor of FIG. 4 of the drawings could be further improved by a mandatory requirement that all road vehicles should display a pair of lights with a specified separation distance and either a specific color, or pattern of flashes, which the visual protection sensor could be configured to detect. This would allow continuous operation, both day and night, and would remove the inaccuracies caused by varying vehicle widths.

Figure 5:
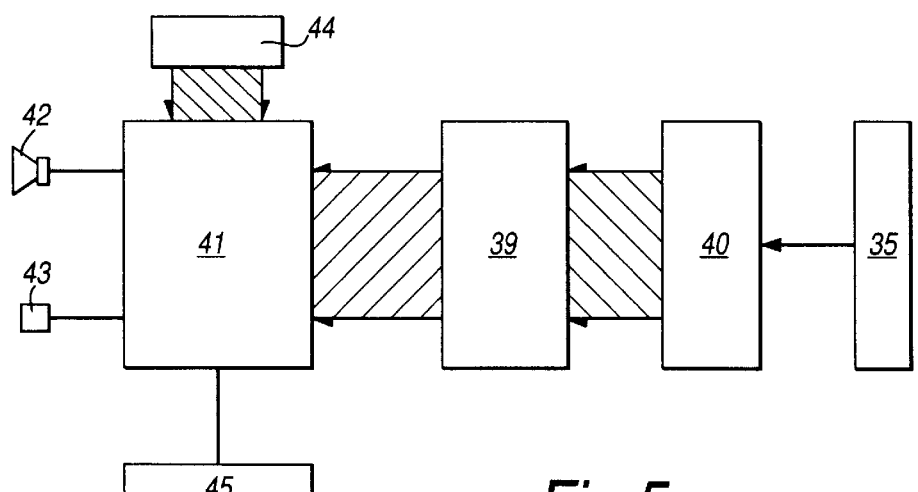
FIG. 5 illustrates one arrangement for the visual protection sensor illustrated in FIG. 4 of the drawings.

One arrangement for the visual protection sensor of FIG. 4, which is diagrammatically illustrated in FIG. 5 of the drawings, includes a data processor 39, according to the present invention, connected to the output of the CCD image sensor 35 of FIG. 4 of the drawings via an analogue to digital converter (ADC) 40 having buffer storage means for the output of the light sensor 35. The output of the data processor 39 is connected to the input of a control circuit 41, one output of which is connected to a speaker system 42 for giving an audible warning to the driver of the vehicle and another output of which is connected to a warning light 43 for giving a visual warning to the driver of the vehicle. The control circuit 41 is connected to the output of a read only memory (ROM) 44 and to the vehicle speed output of an engine management unit 45.

In operation, the output of the CCD image sensor 35 is applied to the ADC 40 which converts it to a digital word. When all the pixels of the CCD image sensor 35 have been read out, an n-bit parallel output signal of the ADC 40 is applied to, and processed by, the data processor 39. The output of the data processor 39 is applied to the input of the control circuit 41 which is adapted to use the vehicle speed output of the engine management unit 45 to estimate the minimum sate separation distance from the vehicle in front and to compare this estimate with the separation distance measured by the visual protection sensor. If the minimum separation distance between the vehicles has been exceeded, then the control circuit 41 is adapted to turn on the warning light 43 and, by using a digitised speech message stored in the ROM 44, effect operation of the speaker system 42 and give a spoken warning to the driver of the vehicle.

Figure 6:
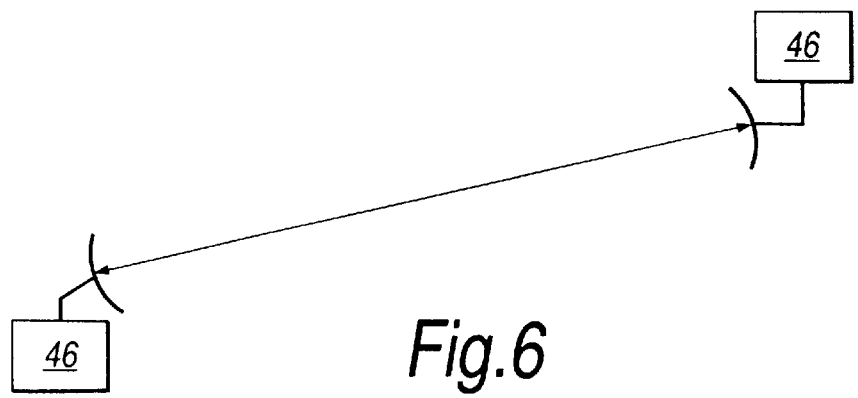
FIG. 6 illustrates a system for at least the partial alignment of at least two equipments for the purpose of transferring information therebetween.

Another application of the data processor according to the present invention which is illustrated in FIG. 6 of the drawings, relates to the alignment, or partial alignment, of the antenna of at least two equipments 46 and 47 for the purpose of transferring information between equipments either unidirectionally or bidirectionally.

The equipments 46 and 47 could be independently mounted either on a fixed body, or a moving body.

The purpose of these applications of the data processor according to the present invention is to provide, via a look-up table or other storage means, a position reference (which could be, but is not necessarily limited to, star sensor arrangements) for one or both equipments 46 and 47 to facilitate alignment of the information transfer antenna or antennas.

The data processor could, for example, be used to align satellite antenna with a ground station, or with at least one other satellite.

Alternatively, the data processor could be used with the satellite's beam former to correct for movement of the satellite and to thereby keep the generated beam pointed in a desired direction.

With such arrangements, the satellite could be moving in a geostationary orbit and the correction could, therefore, be used to increase the life of the satellite due to the fuel savings resulting from the correction.

If the satellite is in a non-geostationary orbit, then the data processor could be used to aim the beam at a given area in the sky.

If the satellite is revolving and only pointing at the ground station, or another satellite, for a short period of time, then the data processor could be used to correct the 'pointing' of the satellite to give a longer contact time for information transfer and to thereby recover, what might otherwise be, an out of control satellite, or to allow a better contact time, if the rotation of the satellite is intentional.

Figure 3:
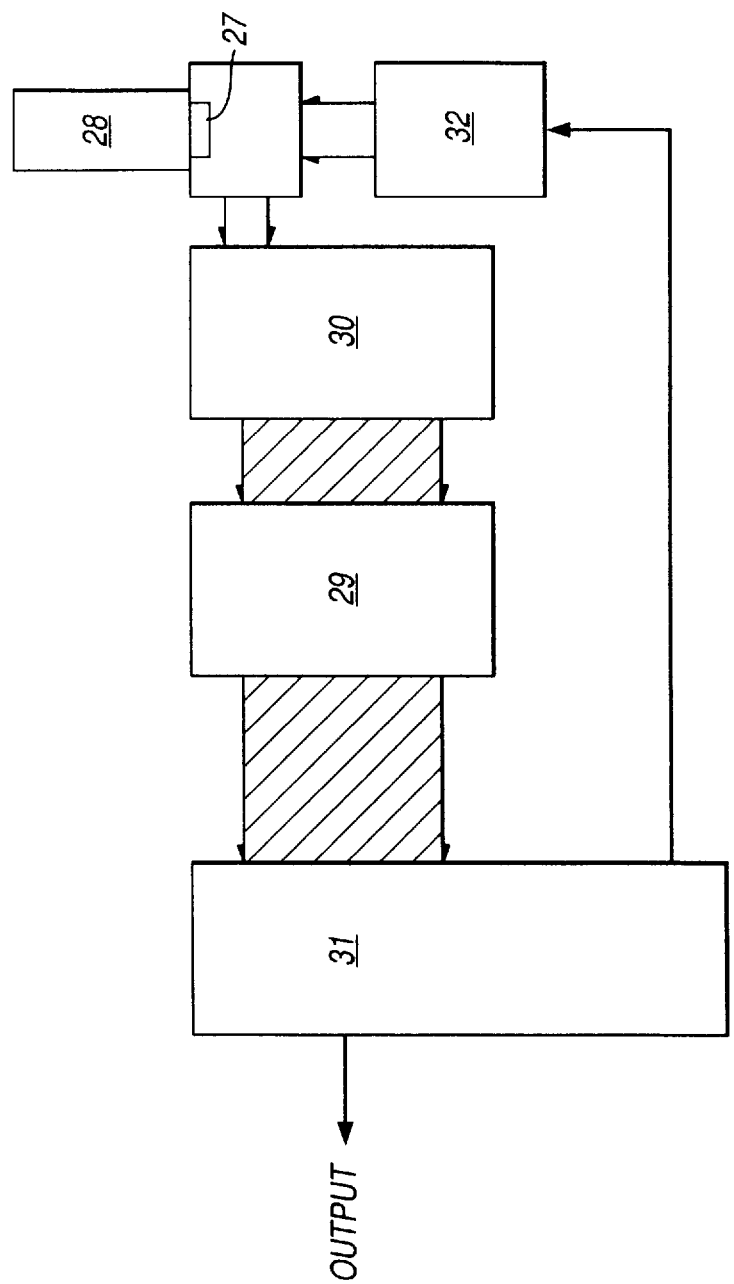
FIG. 3 illustrates a star sensor system which includes the data processor illustrated in FIG. 1 of the drawings.

A further application of the data processor according to the present invention is in a star sensor on a satellite, for example, the star sensor shown in FIG. 3 of the drawings.

The star sensor according to FIG. 3 includes a CCD array 27 having a lens 28 associated therewith which causes the light radiating from the night sky to be applied to the CCD array 27.

The output from the CCD array 27 is connected to a data processor 29, according to the present invention, via an analogue to digital converter (ADC) 30 having input buffer stores for the output for the CCD array 27.

The series of discrete n-bit parallel output signals of the data processor 29 which could be in the form of two 12-bit words that are each representative of the magnitude and relative position of the output of a pixel of the array 27, is connected to the input of a parallel to serial converter 31 having associated therewith means for identifying the relative positions of the data elements and means for controlling the operation of a CCD drive circuit 32.

The drive circuit 32 causes the outputs of the rows of the CCD array 27 to be successively connected to the input of the ADC 30.

The output of the converter 31 which will be a series of discrete data signals indicative of the magnitudes of the N-highest light radiation levels detected by the CCD array 27 and their relative positions, is compared by means of a computer with known star data in order to determine the positions of the located stars.

The locations of the stars in different sectors of the sky together with their light radiation values are known and are contained in star separation tables. It is this data which is compared with the output of the converter 31 to identify the star field that is being viewed via the lens 28.

Figure 7:
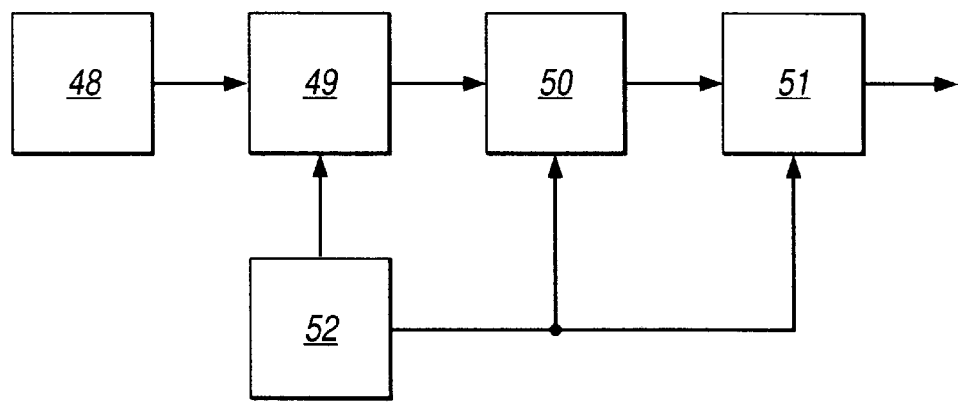
FIG. 7 illustrates, in the form of a block diagram, a data processing system including a data processor according to the present invention.

The data processor according to the present invention may be used in many other applications and, in particular, systems of the type which are illustrated, in the form of a block diagram, in FIG. 7 of the accompanying drawings.

As illustrated in FIG. 7, the system comprises at least one data processor 49, according to the present invention, having its input connected to a sensor unit 48 and its output connected to the output of the system via a further data processing unit 50 and an interface unit 51. The operation of each element of the system is under the control of a control unit 52. Whilst the sensor unit 48, used for any particular application, is dependent upon the nature of the data being processed, the main function of this unit, in association with the control unit 52, is to detect an analogue input signal and suitably convert each element of the analogue signal into a digital word for application to the input of the data processor unit 49. The output of the sensor unit 48, or the input of the data processor 49 may include buffer storage means for storing the digital word output of the sensor unit prior to its application to the data processor 49. The output of the data processor 49 is, in dependence upon the particular application and under the control of the control unit 52, subject to any necessary further processing by the processor unit 50, and the interface unit 51 ensures, in association with the control unit 52, complete compatibility between the output of the system and the input of the equipment to which the system output is connected. The required construction and mode of operation of the units 50 and 51, to suit a particular application, will be directly evident to persons skilled in the art. Also, depending on the nature of the parameters to be processed, it may be necessary to use more than one of the data processors according to the present invention.

Thus, the data processing system illustrated in FIG. 7 of the drawings could, for example, be used to co-ordinate the separation of two vehicles, where the separation distance is continuously decreases in value until the interception of the two vehicles. With such a system, the analogue signal, at the input of the sensor unit 48, would be indicative of the position of one of the vehicles, relative to the other vehicle, and the output of the system would be applied to a guidance system for the vehicles and used, as appropriate, to correct any deviation from a desired path between the two vehicles. For this application, the sensor unit 48 could be an opto-electronics device and adapted to detect light reflections from either one, or both, of the vehicles. In the case of a laser guidance system for the vehicles the sensor unit 48 could be adapted to detect the light reflections resulting from the use of such a guidance system. Alternatively, the sensor unit could be adapted to sense the output of the vehicle's exhaust system.

The data processing system illustrated in FIG. 7 of the drawings, could also form part of a guidance system for acquiring and homing upon a signal source. For this application, the sensor unit 48 would not only be adapted to sense the signal emanating from the source which could be sound waves (for example, noise), or heat radiation (for example, from a hot spot on an object), or radio signals, but would also be adapted to process the collected data prior to its application to the data processor unit 49, i.e. it would be necessary to interpose a pre-processor unit between the units 48 and 49 which could, in dependence on the nature of the signal source and the collected data, be adapted to effect, for example, fast fourier transformation, correlation, signal level detection etc, of the input data. The output of the interface unit 51 would be applied to a guidance control unit (not illustrated) to enable the guidance system to home in on the signal source.

In a further arrangement for the data processing system of FIG. 7 of the drawings, read/write data storage means could be included to store the current state of the input data, compare the next set of data inputs with the stored data, any differences detected between the two sets of data being used to effect control of the necessary elements to compensate for the difference.

Figure 8:
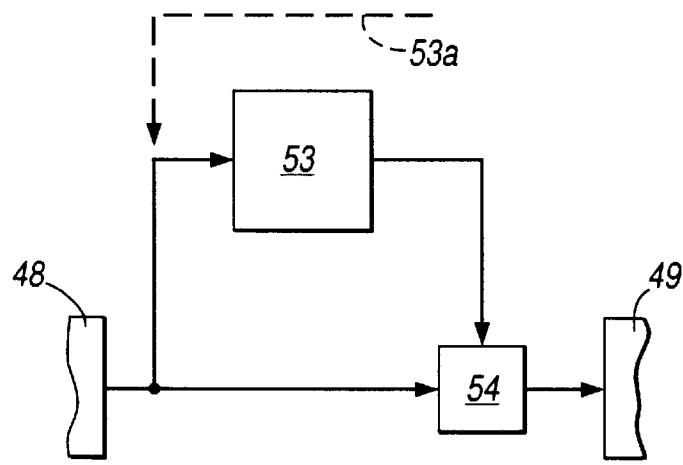
FIG. 8 illustrates, in the form of a block diagram, a modified arrangement for the data processing system according to FIG. 7.

A typical arrangement for the read/write data storage means is illustrated, in the form of a block diagram, in FIG. 8 of the drawings. The read/write data storage means of FIG. 8 is interposed between the units 48 and 49 of the data processing system of FIG. 7 of the drawings, i.e. the input of a read/write data storage unit 53 is connected to the output of the sensor unit 48 and to one input of a subtraction circuit 54, the output of which is connected to the input of the data processor 49, and the output of the sensor unit 48 is connected to another input of the subtraction circuit 54.

Thus, in operation, each frame of the digital output of the sensor unit. 48 is simultaneously applied to an input of the subtraction circuit 54 and to the input of the read/write data storage unit 53 where it is stored pending receipt of the next data frame. On receipt of data frame, the read/write data storage unit 53 causes a previously stored data frame to be applied to the other input of the subtraction circuit 54, any difference between the two data frames being detected and applied to the input of, and processed by, the data processor unit 49. The output of the data processor unit 49 is used, in the manner outlined above, to effect control of the necessary elements to compensate for the difference. This method of operation, i.e. frame-by-frame, whilst suitable for a number of applications of the data processing system according to the present invention, does not take account of the cumulative effect of the changes in the input signal.

In those application where the cumulative effect of the input signal variations is a necessary requirement, the system can be reconfigured by connecting the input to the read/write data storage unit 53, as shown by the dotted line 53a, to the output of the data processor unit 49 rather than to the output of the sensor unit 48. With this arrangement, the input of the sensor unit. 48 is compared, in the manner outlined above, with the output of the data processor unit 49 thereby taking account of the cumulative effect of the input signal variations.

Figure 9:
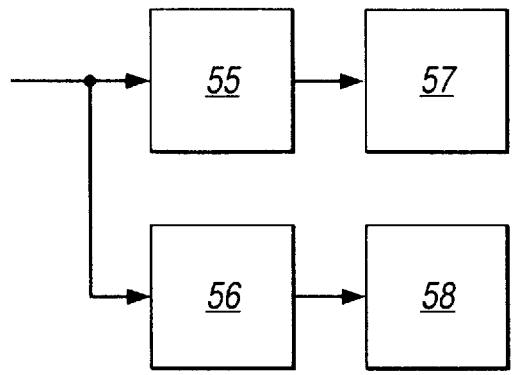
FIG. 9 illustrates, in the form of a block diagram, another modified arrangement for the data processing system according to FIG. 7.

The interface unit 51 of the data processing system of FIG. 7 of the drawings could be replaced by the electronic drive and control system which is illustrated, in the form of a block diagram., in FIG. 9 of the accompanying drawings. A data processing system of this type could be used, for example, to maintain the alignment of a tracking device upon a target by manipulating the mounting points of the sensor, or as part of a vehicle guidance system.

For the target tracking arrangement, the blocks 55 and 56 would respectively be in the form of an x-axis drive unit and a y-axis drive unit for the tracking device, and the blocks 57 and 58 would respectively be in the form of an x-axis actuator unit and a y-axis actuator unit for the tracking device. Thus, any detected deviation in the alignment of the tracking device will cause the output of the processor unit 50 to cause, under the control of the control unit 52, an output signal to be applied to either the x-axis drive/actuation units 55 and 57, or the y-axis drive/actuation units 56 and 58, to effect a corrective change to the alignment of the tracking device.

For the vehicle guidance system, wherein the vehicle is required to follow a path defined by a light reflective line marked on the surface the road, or the like, the sensor unit 48 would be adapted to sense the light reflected by line marking and the blocks 55 and 56 would respectively be in the form of a left-hand drive unit and a right-hand drive unit for the vehicle guidance system, and the blocks 57 and 58 would respectively be in the form of an left-hand actuator unit and a right-hand actuator unit for the vehicle guidance system With this arrangement, the sensor unit 48 could include a single linear row of charged coupled devices (CCDs) and be adapted, such that, the light reflected by the line marking would normally causes illumination of the CCDs located in the center of the single row, i.e. a centrally located band of CCDs, when the vehicle is following the correct path. Thus, any deviation from the correct path would result in the light reflected by the line marking to illuminate at least one of the CCDs on one, or other, of the sides of the centrally located band of CCDs. This would be detected by the data processor unit 49 and would result in a signal being applied, under the control of the control unit 52, to either the left-hand, or right-hand drive/actuator units and to thereby adjust the steering of the vehicle until it is following the correct path.

This vehicle guidance system can be used with multi-path systems which run adjacent to, or cross, each other, provided that each of the paths is defined by a line marking having different light reflective properties to the line markings for each of the other paths. For example, for a system having three paths, one of the paths could be defined by a white line, another of the paths by a light grey line, and the other of the paths by a dark grey line. The data processor unit 49 could, in association with the control unit 52, be adapted to provide output signals for controlling the direction of travel of the vehicle such that it follow a preselected one of the multi-paths.

In mobile radio telephone systems, the radio link established between a called party and a calling party can fade due to signal strength variations, or, in some instances, be totally lost. Whilst known mobile telephone systems include means for overcoming these problems, they are not always successful, and tend to be slow in operation.

Figure 10:
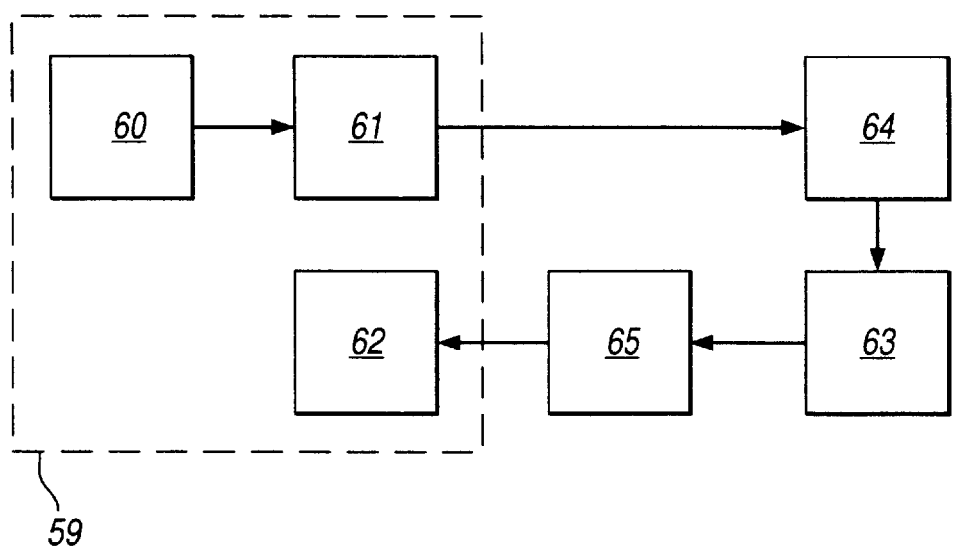
FIG. 10 illustrates, in the form of a block diagram, a mobile telephone handset including a data processor according to the present invention.

The data processor according to the present invention can be used, in a manner which is illustrated in FIG. 10 of the accompanying drawings, as part of a mobile telephone handset, to detect and recognise an electromagnetic signal, and maintain reception with another party at an acceptable level. Furthermore, this method of overcoming the above-mentioned problems of known systems, is much quicker, and more efficient, than the known solutions.

In FIG. 10, the electronic components of the mobile telephone handset for determining the channel frequency for the handset are enclosed by a dotted line 59 and comprise a radio frequency (rf) receiver 60, a mixer circuit 61 and a local oscillator 62 which are interconnected, and operate, in a manner known to persons skilled in the art. The data processor according to the present invention is represented by the block 63, The input of the data processor 63 is connected to the output of a multi-frequency detector 64, and the output of the data processor 63 is connected to an input of the local oscillator 62 via a control unit 65. The input of the multi-frequency detector 64 is connected to an output of the mixer circuit 61. Thus, all of the signal channel frequencies which are received by the rf receiver 60, will be applied to the input of the multi-frequency detector 63. The data processor 63 is adapted to monitor, in a manner as previously outlined, the signal strength of each of the received requency channels and to generate an output signal for application to the local oscillator 62, via the control of the control unit 65, either to correct for any drift in the operating channel frequency of the mobile telephone, or, in the case of unacceptable signal strength variations, to change the operating channel frequency of the mobile telephone handset to a new frequency channel having a higher signal strength.

It will be seen from the foregoing that the data processor according to the present invention can be used in many different applications, some of which have been described and others of which will be directly evident to persons skilled in the art.

We claim:

1. A data processor for selecting from a series of discrete input data elements, the elements having the N highest magnitude values and for storing the selected elements, in ascending order according to their value, one in each of N identical cells connected in cascade, wherein the element having the next highest value is stored in first comparator means that are adapted, on receipt of an input data element having a value higher than the value of the element stored therein, to generate an output for effecting storage of the said data element, according to its value, in that one of the N cells that corresponds to its position in the ascending order of element values, in that the elements of lower value in the said one of the N cells and the lower cells are transferred to and stored in the adjacent lower cell, the element stored in the lowest of the N cells being transferred to the comparator means for comparison with the subsequently received input data elements, and in that means are provided for causing the stored elements to be read out as a series of discrete data elements.

2. A data processor as claimed in claim 1 wherein the input data elements are each translated into a discrete digital word having one part thereof of a value indicative of the magnitude of the respective input data element and another part thereof indicative of the position of the respective element relative to the other input data elements.

3. A data processor as claimed in claim 2 wherein the first comparator means include a comparator connected to the input of the data processor and to the output of the said lowest of the N cells via first latching means that are adapted to store a data element for comparison with the input data elements.

4. A data processor as claimed in claim 1 wherein the data processor includes synchronization means for generating clock pulses for controlling the selection and storage of the data elements in the N identical cells, the synchronization means being actuated by the output of the first comparator means.

5. A data processor as claimed in claim 4 wherein the synchronization means includes first gating means for the N cells, a source of clock pulses and second gating means for the first comparator means, in that the inputs of the first gating means are respectively connected to the output of the first comparator means and the source of clock pulses, and in that the output of the first gating means is connected to each of the N cells and to the second gating means.

6. A data processor as claimed in claim 1 wherein each of the N identical cells includes data selection means the inputs of which are respectively connected to the input of the data processor and the input terminals of the cell; second latching means the input of which is connected to the output of the data selection means; third latching means the input of which is connected to the output of the second latching means and the output of which is connected to the output terminals of the cell; second comparator means the inputs of which are respectively connected to the output of the second latching means and the input of the data processor; and control means which are responsive to the outputs of the first and second comparator means for effecting operation of the data selection means and the second and third latching means of each of the N cells.

7. A data processor as claimed in claim 6 wherein the control means for each of the N cells includes inversion means the input of which is connected to the output of the first gating means which is also connected to, and controls the operation of, the third latching means; a first AND gate the inputs of which are respectively connected to the output of the inversion means and the output of a first OR gate, the output of the first AND gate being connected to, and controls the operation of, the second latching means; a second AND gate the output of which is connected to an input of the first OR gate and the inputs of which are connected to the outputs of the second comparator means of each of the lower cells in the cascaded series of N cells; a second OR gate the inputs of which are connected to the outputs of the second comparator means of each of the higher cells in the cascaded series of N cells; a third AND gate the inputs of which are respectively connected to the output of the second OR gate and the output of the second comparator means; a third OR gate an input of which is connected to the output of the third AND gate and the output of which is connected to, and controls the operation of, the selection means; and in that the read out means are connected to an input of each of the first and third OR gates.

8. A data processor as claimed in claim 1 wherein the data processor includes data input means for converting each element of an analogue data input signal into a first digital signal having n-bits of information indicative of the magnitude of the respect element of the data input signal and means for generating a second digital signal having z-bits of information indicative of the position of the respective element of the data input signal relative to the other elements, the first and second digital signals being combined to provide discrete digital words having n+z-bits of information.

9. A data processor as claimed in claim 8 wherein each element of the data input signal is representative of the intensity of light falling on a light sensor which forms part a two dimensional array of light sensors.

10. A data processor as claimed in claim 1 wherein the data processor includes an integrated circuit chip having formed therein at least the N identical cells and the first comparator means.

11. A data processor as claimed in claim 10 wherein the data processor includes a number of integrated circuit chips connected in cascade.

12. A data processor as claimed in claim wherein the integrated circuit chips consist essentially of a material selected from the group comprising SOS, CMOS, TTL, BiCMoS and GaAs.

13. A data processor as claimed in claim wherein the integrated circuit chips are fabricated using an optical processing technique.

14. A data processing system as claimed in claim 1 wherein the system is adapted to control, and/or identify, the relative positions of at least two moving vehicles.

15. A system as claimed in claim 14 wherein the system is adapted to determine the separation distance between two moving vehicles.

16. A system as claimed in claim 14 wherein each of the said at least two vehicles has two light, or reflective, patches on an exposed surface thereof and in that the data processor is adapted to select the brightest points and thereby effect identification of the position and separation distance of the two vehicles.

17. A system as claimed in claim 16 wherein each of the said at least two vehicles includes a visual protection sensor for determining its separation distance from the vehicle in front and in that the visual protection sensor comprises a light sensor fitted to the front of a vehicle; a filter unit for the light sensor, located in alignment with the light sensor; and a lens interposed between the light sensor and the filter unit.

18. A system as claimed in claim 17 wherein the light sensor is a single row of charged coupled devices adapted to be fitted, in a central position, to the front of a vehicle.

19. A system as claimed in claim 18 wherein each of the said at least two vehicles includes an analogue to digital convertor having buffer storage means for the output of the light sensor, the input of which is connected to the output of the light sensor and the output of which is connected to the input of the data processor; control means connected to the output of the data processor for estimating the minimum safe separation distance from the vehicle in front and for comparing this estimate with the separation distance measured by the visual protection sensor; and warning means connected to the output of the control means for giving a warning in the event that the safe minimum separation distance has been exceeded.

20. A system as claimed in claim 19 wherein each of the said at least two vehicles includes an engine management unit, an engine speed output of which is connected to an input of the control means and which is used to estimate the safe minimum separation distance.

21. A system as claimed in claim 19 wherein the warning means include a visual warning for the driver of the vehicle.

22. A system as claimed in claim 19 wherein the warning means include an audible warning for the driver of the vehicle.

23. A system as claimed in claim 22 wherein the warning means include a loud speaker; and a read only memory having a digitized speech message stored therein, the output of the read only memory being connected to an input of the control means and in that, in the event that the safe minimum separation distance has been exceeded, the output of the read only memory is connected to the loud speaker to give a spoken warning.

24. A system as claimed in claim 1 wherein the system is adapted to control at least the partial alignment of at least two equipments.

25. A system as claimed in claim 24 wherein the system is adapted to control at least the partial alignment of the antenna of at least two satellite dishes.

26. A system as claimed in claim 11 wherein the system includes sensor means, having an output thereof connected to an input of the data processor, the output of said data processor being connected to an input of data processing means, interface means connected to the output of the data processing means, and control means for controlling the operation of the system, said interface means being adapted, under the control of the control means, to convert the output of the data processing means into a form which is suitable for application to the input of an equipment to which the system is to be connected and to thereby provide complete compatibility between the system output and the equipment input.

27. A system as claimed in claim 26 wherein the system further includes buffer storage means for storing the output of the sensor means prior to its application to the data processor.

28. A system as claimed in claim 26 for coordinating the separation of two vehicles where the separation distance is continuously decreasing in value until the interception of the two vehicles, wherein the sensor means are adapted to sense the position of one of the vehicles, relative to the other vehicle, in that the system includes a guidance system for the vehicles, and in that the system output is connected to the guidance system and adapted to correct any deviation from a desired path between the two vehicles.

29. A system as claimed in claim 28 wherein the guidance system is a laser guidance system and in that the sensor means include an optoelectronic device for detecting light reflections from at least one of the vehicles.

30. A system as claimed in claim 28 wherein the sensor means are adapted to sense the output of the vehicle's exhaust system.

31. A guidance system for acquiring and homing in upon a signal source, wherein the guidance system includes a system as claimed in claim 26 additional data processing means for processing the output of the sensor means prior to its application to the data processor, and guidance control means connected to the output of the interface means.

32. A system as claimed in claim 31 wherein the sensor means are adapted to sense either sound waves, or heat radiation, or radio signals.

33. A system as claimed in claim 32 wherein the additional data processing means are adapted to effect either fast fourier transformation, or correlation, or signal level detection, of the output of the sensor means.

34. A system as claimed in claim 26 further including read/write data storage means which include a read/write storage unit, and signal subtraction means having a first input connected to an output of the read/write storage unit, and a second input connected to the output of the sensing means, the output of the signal subtraction means being connected to the input of the data processor.

35. A system as claimed in claim 34 herein the input of the read/write storage unit is connected to the output of the sensor means and adapted to successively read and store each frame of the output data of the sensor means, in that each of said data frame outputs of the sensor means is simultaneously applied to said second input of the signal subtraction means, and in that, in response to the receipt and storage of a data frame by said read/write storage unit, the previously store data frame is applied to said first input of the signal subtractions means.

36. A system as claimed in claim 34 wherein the input of the read/write storage unit is connected to the output of the data processor and adapted to successively read and store the data output of the data processor, in that the data output of the sensor means are applied to said second input of the signal subtraction means, and in that, in response to the receipt and storage of a data frame by said read/write storage unit, the previously store data frame is applied to said first input of the signal subtractions means.

37. A system as claimed in claim 26 wherein said interface means include electronic drive and control means.

38. A system as claimed in claim 37 wherein the system maintains the alignment of a vehicle tracking system, in that the electronic drive and control means include an x-axis drive unit and a y-axis drive unit for the tracking system, each of the drive units being connected to the output of the data processor via said data processing means, an x-axis actuator unit connected to the output of the x-axis drive unit, and a y-axis actuator unit connected to the output of the y-axis drive unit, and in that any detected deviation in the alignment of the tracking system causes a signal to be applied to either the x-axis, or y-axis drive and control units to effect a corrective change to the alignment of the tracking system.

39. A vehicle guidance system including a system as claimed in claim 37 wherein the vehicle is required to follow a path defined by a light reflective line marked on the surface of a road, in that the sensor means are adapted to sense the light reflected by said line marking, in that the electronic drive and control means include left-hand and right-hand drive units for the vehicle, the inputs of which are connected to the output of the data processor via said data processing means, and left-hand and right-hand actuator units, the inputs of which are connected to respective ones of the outputs of the drive units, and in that any detected deviation from said defined path causes a signal to be applied to either the left-hand, or right-hand drive and actuator units to effect a corrective change to the steering system of the vehicle.

40. A system as claimed in claim 39 wherein the sensor means (48) include a single linear row of charged coupled devices, in that the light reflected by said line marking, when the vehicle is following the correct path, causes illumination of a central band of the row of charge coupled devices, and in that any deviation from the correct path causes the reflected light to illuminate at least one of the charge coupled devices on one, or other, of the sides of said central band of charge coupled devices, and thereby causes the generation of a corrective steering signal.

41. A system as claimed in claim 39 wherein the vehicle is adapted to follow any one of a number of paths running adjacent to, or cross, each other, in that each of the paths is defined by a line marking having different light reflective properties to the line markings for each of the other paths, and in that the system is adapted to respond to the light reflections of only a selected one of the paths.

42. A system as claimed in claim 41 wherein the vehicle is adapted to follow any one of three paths, and in that the three paths are respectively defined by a white line, a light gray line, and a dark gray line.

43. A data processing system as claimed in claim 1 wherein the system is a telephone handset for a mobile radio telephone system.

44. A telephone handset for a mobile radio telephone system as claimed in claim 43 wherein the handset includes means for determining the channel frequency for the handset comprising a radio frequency receiver, a mixer circuit and a local oscillator; a multi-frequency detector having the input thereof connected to the output of the radio frequency receiver and the output thereof connected to the input of the data processor; and local oscillator control means having the input thereof connected to the output of the data processor and the output thereof connected to the input of the mixer circuit.

45. A telephone handset as claimed in claim 44 wherein the data processor is adapted to monitor the signal strength of each of the received frequency channels and to generate an output signal for application to the local oscillator to either correct for any drift in the operating channel frequency of the mobile telephone, or, in the case of unacceptable signal strength variations, to change the operating channel frequency of the mobile telephone handset to a new frequency channel having a higher signal strength.

46. A star sensor including a two dimensional array of light sensors; a lens for the light sensor array; first means for successively connecting the rows of the sensor array to the input of the data processor, the output signals of each row of the sensor array being a series of discrete signals the magnitudes of which are representative of the intensity of light falling on the respective ones of the light sensors in the row; an analogue to digital converter connected to the input of the data processor and having buffer storage means for the output of the light sensor array; a parallel to serial converter connected to the output of the data processor and adapted to control the operation of the first means; and second means connected to the output of the parallel to serial converter for identifying the locations of the stars the light outputs of which were detected by the light sensor array.

47. A star sensor as claimed in claim 46 herein each of the data elements applied to the input of the parallel to serial converter is in the form of two 12-bit parallel words.

* * * * *